3,532,628

PIEZOELECTRIC CERAMIC MATERIAL

Hideo Watanabe, Kofu-shi, and Yoshiaki Midori, Yuri-gun, Japan, assignors to TDK Electronics Co., Ltd., Tokyo, Japan No Drawing. Filed Nov. 20, 1967, Ser. No. 684,531
Claims priority, application Japan, Nov. 28, 1966, 41/77,525
Int. Cl. C04b *35/00*
U.S. Cl. 252—62.9 1 Claim

ABSTRACT OF THE DISCLOSURE

Piezoelectric ceramic material, useful in electromechanical transducers, is formed by addition of both tungsten oxide ($WO_3$) and chromium oxide ($CR_2O_3$) at the same time to a ferroelectric oxide composed mainly of lead titano-zirconate.

This invention relates to piezoelectric ceramic material which is suitable for use in an electromechanical transducer.

An object of this invention is to provide a new polycrystalline piezoelectric ceramic material which is characterized by higher electromechanical coupling coefficient and also higher mechanical Q-value than those of the conventional materials.

Along with the recent advance in the electronic industries, the requirements imposed on the characteristics of piezoelectric elements utilized have become more exacting. In the case of those elements embodied in electromechanical filters and electromechanical transducers for high power supersonic generation, both high electromechanical coupling coefficient and also high mechanical Q-value are strictly required. In view of such a situation, the piezoelectric ceramic of the present invention meets the requisites very satisfactorily.

As is well known, recent advances in electronic devices have kept pace with the remarkable improvements in polycrystalline piezoelectric ceramics. Among them the solid solutions of lead zirconate and lead titanate $$pb(Zr_xTi_{1-x})O_3$$

have been widely employed, since they admirably possess desirable piezoelectric characteristics and exhibit large piezoelectric effect in the range near equimolar composition of both constituents, where morphotropic transition occurs. But such compositions still do not fully meet the requirements in the present day electronic devices. Thus several improvements have hitherto been proposed. An example of such compositions is the one in which a part of the lead ions $Pb^{++}$ are replaced by ions of divalent alkaline earth metals such as Ca, Sr, Ba and so forth, to prevent difficulties in fabrication. Another example is a ternary composition, for instance $pb(Ti_xZr_ySn_{1-x-y})O_3$ in which a part of the titanium ions $Ti^{++++}$ and/or zirconium ions $Zr^{++++}$ are replaced by tetravalent ions of tin (Sn) and/or hafnium (Hf). There are still further examples, in which small amounts of various oxides are added to the basic composition of lead titano-zirconate $Pb(Ti_xZr_{1-x})O_3$ or lead titano-zircono-stannate $$Pb(Ti_xZr_ySn_{1-x-y})O_3$$

in the above in order to attain the desired characteristics. For instance, it is disclosed in Japanese Pat. No. 275,421 that the characteristics are improved by addition of from 0.2 to 1.5 weight percent of $Cr_2O_3$ and/or $U_3O_8$ to the solid solution lead zircono-titanate of the molar ratio from 60:40 to 45:55, in which less than 10 mol percent of lead is replaced by Sr and/or Ca. It is described that high electromechanical coupling constant and relatively high mechanical Q-value were thus attained and, at the same time, aging and temperature variations of characteristics seen in $Pb(Zr_xTi_{1-x})O_3$ were overcome. Similarly, an example of improvement of the characteristics by additon of from 0.2 to 8 weight percent to the basic composition $$Pb(Ti_xZr_{1-x})O_3$$

$$(x=0.1\sim0.6) \text{ or } Pb(Ti_xZr_ySn_z)O_3\ (x=0.1\sim0.6$$

$y=0\sim0.9$, $z=0\sim0.005$), in which a part of the lead can be replaced by one or more of strontium, calcium, barium and so forth, is disclosed in Japanese Pat. No. 463,143 and Japanese published patent application 8,629/1966. It is described that improvements in electromechanical coupling coefficient, dielectric constant and specific resistivity were thus achieved. There are many other examples of addition of oxides, for instance $IrO_2$, $ThO_2$ and so forth, to a similar basic composition. But the increase of both electromechanical coupling coefficient and at the same time mechanical Q-value is difficult to attain and in fact has rarely been reported in the technical publications. For instance, the example of Japanese Pat. No. 275,421 mentioned above states that the composition $$Pb(Zr_{0.54}Ti_{0.46})O_3+0.5$$

weight percent $Cr_2O_3$ exhibits the very high mechanical Q-value 463, but its electromechanical coupling coefficient is only 40%. Similarly, the example of Japanese Pat. No. 463,143 and Japanese published patent application No. 8,629/1966 states that the composition $$Pb(Zr_{0.51}Ti_{0.049})O_3$$

to which is added 2.0 weight percent of $WO_3$ possesses a high electromechanical coupling coefficient of 57%, but its mechanical Q-value is only 85 and therefore it can be utilized only in acoustic transducers.

This invention overcomes the defects of the materials mentioned above and provides polycrystalline piezoelectric materials with high electromechanical coupling coefficient and also high mechanical Q-value by the addition of a small amount of both chromic oxide and tungsten oxide to the basic composition of lead zircono-titanate.

In the composition in accordance with this invention, it is possible to attain an electromechanical coupling coefficient higher than 50% and at the same time a mechanical Q-value higher than 250.

The invention is illustrated by the following example.

EXAMPLE

The purity of raw materials used was chemical grade. PbO, $ZrO_2$ and $TiO_2$ were taken in such amounts to yield, as the final composition, $Pb(Zr_{0.54}Ti_{0.40})O_3$, and 0.5 weight percent of $WO_3$ and 0.18 weight percent of $Cr_2O_3$ were added thereto and the whole wet-mixed in a ball mill for 24 hours. The mixture was calcined at 850° C. for 2 hours, and the reaction product was crushed and mixed so that particle diameter was less than 1$\mu$. After addition of binder, such as polyvinyl alcohol, the powder was pressed into the form of a 16 mm. cylinder of 1 mm. thickness, which was then sintered at 1180° C. The heat treatment was in a closed furnace as is usual to prevent the evaporation of lead.

The sintered disk was made into a piezoelectric body by a per se conventional method. For instance, it was electroded on both sides and D.C. electric field of 3000 v./mm. was applied between the electrodes in silicone oil to polarize it. The disk-shaped electromechanical transducer obtained possesses the radial electromechanical coupling coefficient of 62%, which is unattainable by the addition of solely one oxide, and at the same time its mechanical Q-value is as high as 450, and also its dielectric constant is 1356.

The characteristic values of electromechanical transducer of the various compositions with different amounts of $WO_3$ and $Cr_2O_3$ added are given in Table 1. The method of manufacturing is the same as in the above example. The columns show, from the left, the number of the specimens, the composition of the basic component lead zircono-titanate, the content of added tungsten oxide $WO_3$ (in weight percent), the same of chromic oxide $Cr_2O_3$ (weight percent), dielectric constant: $\epsilon$, radical electromechanical coupling constant: $\overline{Kr}$ (percent), and mechanical Q-value: QM. It is clear from Nos. 1 to 15, 18 and 19 in Table 1 that an electromechanical transducer in accordance with this invention exhibits radial electromechanical coupling coefficient of at least more than 51% and in most cases more than 55% and along with it mechanical Q-value more than 400. As seen from Nos. 16 and 17 of Table 1, the mechanical Q-value is reduced when the content of $WO_3$ exceeds 2.0%.

Thus excellent piezoelectric ceramic materials are provided according to the composition of this invention. The most excellent effect of the additions appears when the amount of tungsten oxide $WO_3$ added is from 0.1 to 0.5 weight percent and that of chromic oxide is from 0.05 to 0.5 weight percent. The effect achievable by the coexistence of both oxides disappears if the contents of $WO_3$ and $Cr_2O_3$ are less than 0.1 weight percent and 0.05 weight percent respectively. The mechanical Q-value becomes poor when the content of $WO_3$ exceeds 1.5 weight percent and the electromechanical coupling coefficient becomes less than 50% when the content of $Cr_2O_3$ exceeds 0.5 weight percent; thus the addition is meaningless in both cases.

TABLE 1

| | Composition of basic component | Added reagent weight percent | | | | |
|---|---|---|---|---|---|---|
| | | $WO_3$ | $Cr_2O_3$ | $\epsilon$ | $\overline{Kr}$, percent | QM |
| 1 | $Pb(Zr_{0.54}\text{-}Ti_{0.46})O_3$ | 0.1 | 0.05 | 881 | 57 | 472 |
| 2 | Same as above | | 0.10 | 864 | 57 | 460 |
| 3 | do | | 0.18 | 972 | 56 | 481 |
| 4 | do | | 0.50 | 978 | 56 | 604 |
| 5 | do | 0.2 | 0.10 | 986 | 58 | 692 |
| 6 | do | | 0.18 | 946 | 60 | 565 |
| 7 | do | | 0.20 | 940 | 54 | 683 |
| 8 | do | 0.5 | 0.10 | 1,583 | 63 | 414 |
| 9 | do | | 0.18 | 1,356 | 62 | 450 |
| 10 | do | | 0.20 | 1,290 | 60 | 536 |
| 11 | do | 1.0 | 0.10 | 1,320 | 63 | 333 |
| 12 | do | | 0.18 | 1,380 | 60 | 421 |
| 13 | do | | 0.20 | 1,345 | 60 | 443 |
| 14 | do | 1.5 | 0.10 | 1,288 | 58 | 267 |
| 15 | do | | 0.50 | 1,263 | 51 | 343 |
| 16 | do | 2.0 | 0.10 | 1,251 | 55 | 136 |
| 17 | do | | 0.20 | 1,364 | 56 | 140 |
| 18 | $Pb(Zr_{0.53}\text{-}Ti_{0.47})O_3$ | 0.1 | 0.18 | 1,260 | 53 | 459 |
| 19 | $Pb(Zr_{0.55}\text{-}Ti_{0.45})O_3$ | | 0.18 | 1,210 | 54 | 438 |

What is claimed is:

1. A piezoelectric ceramic composition consisting essentially of lead zircono-titanate expressed by the formula $Pb(Zr_x \cdot Ti_{1-x})O_3$, wherein $x$=53 to 55 mol percent, from 0.1 to 1.5 weight percent of tungsten oxide ($WO_3$) and from 0.05 to 0.5 weight percent of chromium oxide ($Cr_2O_3$).

References Cited

UNITED STATES PATENTS 3,347,795 10/1967 Akashi et al. ________ 252—62.9
3,372,121 3/1968 Banno ______________ 252—62.9
3,376,226 4/1968 Akashi et al. ________ 252—62.9

TOBIAS E. LEVOW, Primary Examiner

J. COOPER, Assistant Examiner

U.S. Cl. X.R.

106—39